United States Patent [19]

Church

[11] Patent Number: 4,652,954

[45] Date of Patent: Mar. 24, 1987

[54] METHOD FOR MAKING A THIN FILM MAGNETIC HEAD

[75] Inventor: Mark A. Church, Los Gatos, Calif.

[73] Assignee: International Business Machines, Armonk, N.Y.

[21] Appl. No.: 790,927

[22] Filed: Oct. 24, 1985

[51] Int. Cl.$^4$ .................. G11B 5/235; G11B 5/17; C23F 1/02; B44C 1/22

[52] U.S. Cl. .................... 360/120; 29/603; 156/652; 156/656; 156/659.1; 156/667; 204/192.3; 204/192.35; 427/130; 427/131; 360/123

[58] Field of Search ............... 360/119, 120, 121, 122, 360/123; 29/603; 156/652, 655, 656, 659.1, 661.1, 667, 668; 427/130–132; 204/192 EC, 192 E

[56] References Cited

U.S. PATENT DOCUMENTS

| | | | |
|---|---|---|---|
| 3,508,014 | 4/1970 | Mersing | 360/120 |
| 3,578,920 | 5/1971 | Okamoto et al. | 360/120 |
| 3,721,000 | 3/1973 | Okamoto et al. | 29/603 |
| 3,795,954 | 3/1974 | Alex et al. | 29/603 |
| 4,172,318 | 10/1979 | Huntt | 29/603 |
| 4,239,587 | 12/1980 | Koel et al. | 252/79.3 X |
| 4,436,593 | 3/1984 | Osborne et al. | 156/656 X |
| 4,481,071 | 11/1984 | Anderson et al. | 156/656 |
| 4,550,353 | 10/1985 | Hirai et al. | 156/656 X |
| 4,592,801 | 6/1986 | Hara et al. | 156/656 X |

OTHER PUBLICATIONS

IBM Technical Disclosure Bulletin, vol. 27, No. 6, Nov. 1984, pp. 3486–3487, entitled "Fabrication of Thin Film Head" by Mark A. Church.

Primary Examiner—William A. Powell
Attorney, Agent, or Firm—Otto Schmid, Jr.

[57] ABSTRACT

A method for making a thin film magnetic head assembly comprising the steps of depositing a first magnetic pole piece layer, depositing a nonmagnetic material gap forming layer, and depositing a protective layer of etch resistant material. A layer of insulation is deposited upon which is formed a conductive coil. A leveling pad of insulation is deposited over the conductive coil, and the part of the protective layer which is not covered by the insulation is removed. The gap forming layer is therefore protected during the processing steps so that a desired gap length is produced. The second magnetic pole piece layer is then deposited to complete the magnetic circuit.

7 Claims, 10 Drawing Figures

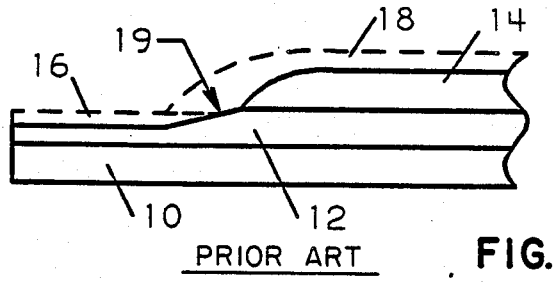
PRIOR ART  FIG. 1
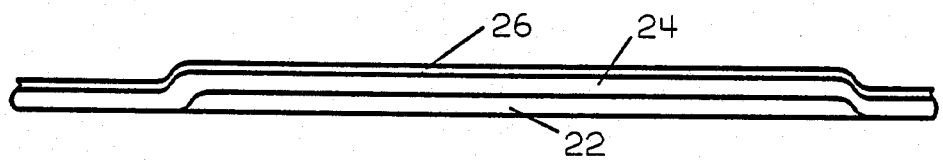
FIG. 2
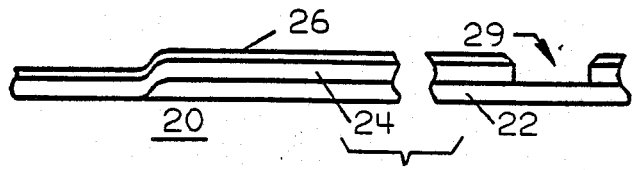
FIG. 3
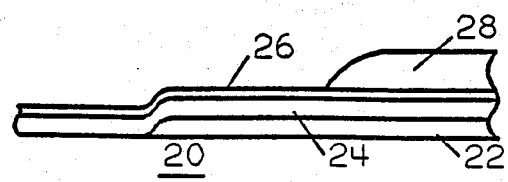
FIG. 4

METHOD FOR MAKING A THIN FILM MAGNETIC HEAD

DESCRIPTION

BACKGROUND OF THE INVENTION

1. Field of the Invention

This invention relates to a method for making a magnetic head, and more particularly to a method for making thin film magnetic heads.

2. Description of the Prior Art

In magnetic recording technology it is constantly desired to improve the areal density at which information can be recorded and reliably read. This desire has lead to a trend toward greater bit density along a magnetic recording track and a shrinking track width.

One of the important parameters which determines the performance of a magnetic head is the gap length. The gap length is defined by the separation of the two magnetic pole pieces at the transducing gap. The separation of the pole pieces is usually established by a gap forming layer of nonmagnetic material.

Another important parameter which determines the performance of a magnetic head is throat height. This parameter is measured from the so-called "zero throat height", which is the point at which the two magnetic pole pieces begin to diverge.

In prior art magnetic recording apparatus, magnetic heads have been employed which have been generally made from laminated assemblies or ferrite materials. With heads of these types, inherent limitations do not permit the manufacture of magnetic heads having transducing gaps of very small length, as is required to meet the present track density and track width requirements.

Thin film magnetic heads can be made having much smaller transducing gaps, and these heads have successfully met the requirements for magnetic recording systems up to the present. However, to further extend the magnetic recording density, it is apparent that serious fabrication problems and severe limitations in manufacturing would be encountered to produce the required dimensions for throat height and transducing gap length.

In prior art thin film head manufacturing processes, there has existed a factor which could present a problem in gap length control known as "gap wedge", and this factor is illustrated in FIG. 1. Shown in FIG. 1 is one magnetic pole piece 10, a layer of nonmagnetic gap forming material 12, and a zero throat height determining insulation layer 14 made of electrically insulative material. During the manufacturing process several sputter etch cleaning steps and sputter deposition steps are included. During the sputter etch cleaning operations, both the gap forming layer 12 and the insulation layer 14 are sputter etched simultaneously. However, the extent of this etching is uncertain since it varies to some extent with position on the wafer. In addition it is possible that chemical solutions will also cause recession in gap forming layer 12 and/or insulation layer 14. The cumulative effects of these operations cause the gap forming layer 12 to be receded from the shape defined by dashed line 16 to the solid line shape shown in FIG. 1. Insulation layer 14 is receded from its original position shown by dashed line 18 to the solid line position shown in FIG. 1. There exists a "gap wedge" area 19 which is caused by the recession in gap forming layer 12 and insulation layer 14. The existence of "gap wedge" area 19 and the uncertainty of its extent prevents the manufacture of thin film magnetic heads having the gap length and the throat height required to achieve the desired recording density.

The prior art does not show a method for making thin film magnetic heads in which the gap forming layer is protected by a protective layer during the manufacturing process so that the gap forming layer is not subjected to the process conditions which cause the "gap wedge" problem encountered in making thin film magnetic head assemblies.

SUMMARY OF THE INVENTION

It is therefore the principle object of this invention to provide a method for making thin film magnetic heads for a very narrow track width and a high bit density along the recording track with a high production yield.

In accordance with a present invention, a thin film magnetic head assembly comprises a nonmagnetic ceramic substrate upon which a series of thin film layers are deposited to form a magnetic head.

The method for making the thin film magnetic head assembly comprises the steps of depositing a first magnetic pole piece layer, depositing a nonmagnetic material gap forming layer, and depositing a protective layer of etch resistant material. A layer of insulation is deposited upon which is formed a conductive coil. A leveling pad of insulation is deposited over the conductive coil, and the part of the protective layer which is uncovered by the insulation is removed. The second magnetic pole piece layer is deposited in contact with the first magnetic pole piece layer to form the back gap closure, and separated from the first pole piece layer by the gap forming layer in the pole tip area to produce the transducing gap.

The protective layer protects the gap forming layer during the steps of producing the conductive coil and the deposition of the insulation layers so that the gap forming layer is not subjected to the process conditions which cause the "gap wedge" problem formerly encountered in making thin film magnetic head assemblies.

Another object of the present invention, therefore, is to provide an enhanced thin film magnetic head assembly and an enhanced method for making the head assembly.

The foregoing and other objects, features and advantages of the invention will be apparent from the following more particular description of a preferred embodiment of the invention is illustrated in the accompanying drawings.

BRIEF DESCRIPTION OF THE DRAWINGS

FIG. 1 is a section view of a partially completed thin film magnetic head which has been fabricated by a prior art thin film magnetic head manufacturing process to illustrate the "gap wedge" problem in that process.

FIGS. 2 to 6 are longitudinal section views illustrating successive steps in the production of a thin film magnetic head according to the present invention.

DESCRIPTION OF THE PREFERRED EMBODIMENTS

Figure 5:
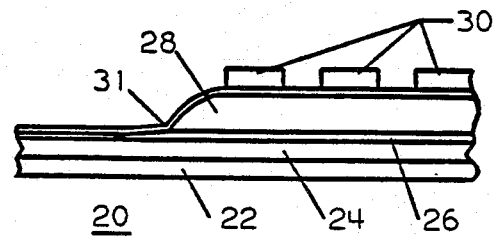
Figure 6:
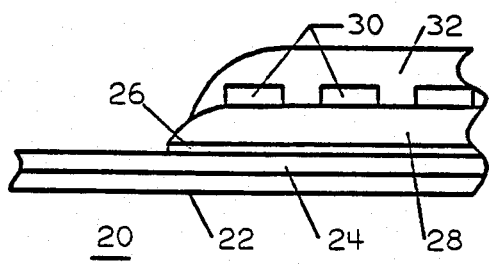
Figure 7:
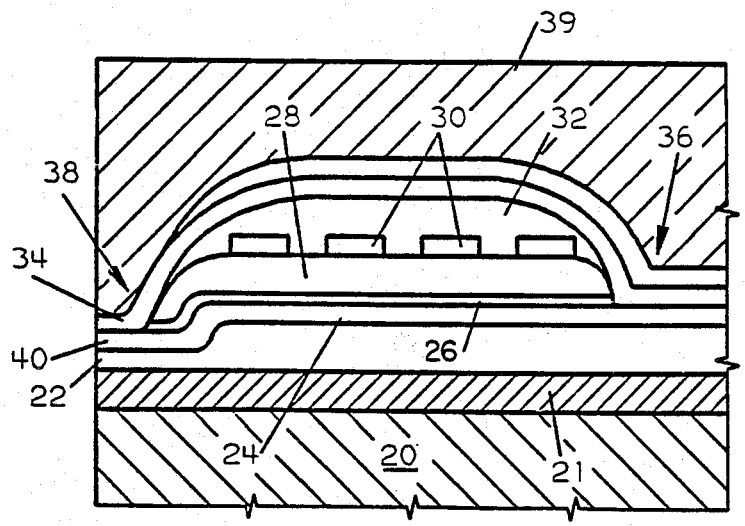
FIG. 7 is a longitudinal section view of a complete thin film magnetic head according to the invention.

With reference to FIGS. 2–7, the thin film magnetic head according to the invention comprises a nonmagnetic ceramic substrate 20 including an insulating layer 21 upon which a series of thin film layers are deposited to form a magnetic head. The magnetic head comprises a first magnetic pole piece layer 22, a nonmagnetic material gap forming layer 24, a protective layer 26 formed of etch resistant material, and a layer of insulation 28 upon which is formed a conductive coil 30. A leveling pad of insulation 32 is deposited over the coil 30. The part of the protective layer 26 which is uncovered by insulation 28 and insulation 32 is then removed prior to formation of the second magnetic pole piece layer 34. The second magnetic pole piece layer 34 is in contact with the first pole piece layer 22 to produce the back gap closure 36, and the pole piece layers 22 and 34 are separated by the thickness of gap forming layer 24 in the pole tip area 38 to produce the transducing gap 40. The entire magnetic head is covered by an overcoat layer 39 of alumina, for instance, to protect the head from damage during handling and operation.

The process for manufacturing the thin film magnetic head, as shown in FIGS. 2–7, comprises the following steps:

1. The nonmagnetic ceramic substrate 20 is prepared by polishing the surface of the substrate 20, and cleaning the surface to prepare for the deposition of the first pole piece layer 22 of magnetic material.

2. The first pole piece layer 22 of magnetic material is formed (FIG. 2) after the substrate 20 is made conductive by metallizing the substrate 20 with a thin film of NiFe, for example, which may be deposited by either vacuum evaporation or sputtering. The first layer 22 of magnetic material of NiFe, for example, is then electroplated onto the conductive surface to the desired thickness through a photoresist mask, having a predetermined pattern. After plating the magnetic pole piece layer 22, which will provide a first pole piece for the magnetic head, the thin metallizing conductive NiFe film is removed by sputter etching of the entire surface.

3. A thin gap forming layer 24 of a nonmagnetic material, which will serve as the transducing gap 40 for the magnetic head, is deposited (FIG. 2) onto the surface of the pole piece material layer 22, by sputtering $Al_2O_3$, for instance, to a thickness as desired to define the length of the transducing gap.

4. A protective layer 26 of an etch resistant material, such as a thin film of chromium, is then deposited (FIG. 2) by sputtering to a thickness of approximately 1500 Angstroms to serve as an isolation layer. The protective layer 26 prevents attack on the gap forming layer 24 by chemical etching, by photoresist developer, for example, all sputter etching steps, and from all photoresist rework that is required.

5. An opening 29 is produced (FIG. 3) in the protective layer 26 and the gap forming layer 24 to serve as a via for the back gap closure 36. The protective layer 26 has opening 29 formed by etching with percloric acid, for instance, and the gap forming layer 24 could be etched by the use of a hot 50% phosphoric acid solution.

6. The protective layer 26 is then covered with photoresist (FIG. 4) which is patterned by exposure and development to form a layer of photoresist insulation 28. The layer of photoresist is hard-baked in an oven to form an electrically insulated layer upon which the copper conductive coil 30 can be produced.

7. The conductive coil 30 is produced on a thin conductive seed layer film 31, which is deposited by vacuum evaporation or sputtering. The copper coil structure 30 is plated through a photoresist mask onto the thin conductive film 31. After plating the relatively thick copper coil structure 30 (FIG. 5), the thin conductive film 31 is removed in unwanted areas by sputter etching the entire surface.

8. A leveling pad of insulation 32 is then deposited (FIG. 6) over the copper coil 30 through one or more depositions of photoresist. The photoresist layers are exposed, developed and hard-baked in an oven to form the insulation 32.

9. The protective layer 26 is removed by etching the layer of chromium (FIG. 6) with percloric acid, for instance. Neither the gap-forming layer 24 nor the pole piece layer 22 are etched during the step of removing the protective layer 26.

10. The second layer of magnetic material to form pole piece 34 is then plated over the insulation layer 32, in the same manner as set forth in step 2 above. This second pole piece layer 34 makes contact with the first pole piece layer 22 in the back gap area 36 to complete the yoke structure necessary for realizing a closed magnetic circuit with a nonmagnetic transducing gap 40.

After the second magnetic pole piece 34 has been formed, the pole tip area 38 is lapped to provide the desired throat height. Once the magnetic head assembly has been completed, the substrate is cut and shaped to provide an air bearing surface for interaction with the recording surface of a magnetic medium, such as a magnetic disk.

As is disclosed in FIGS. 2–7, the protective layer 26 protects the gap forming layer 24 during the steps subsequently producing the coils 30 together with the insulation layers 28 and 32 which keep the coils 30 electrically insulated from the pole pieces 22 and 34. The gap forming layer 24 is therefore not subject to the "gap wedge" problem formerly encountered in the building of thin film inductive heads. With this invention, it is no longer necessary to attempt to anticipate the gap length by the deposition of an excess of alumina for the gap forming layer 24. The excess would be removed in the subsequent processing steps to arrive at the required gap length.

Figure 8:
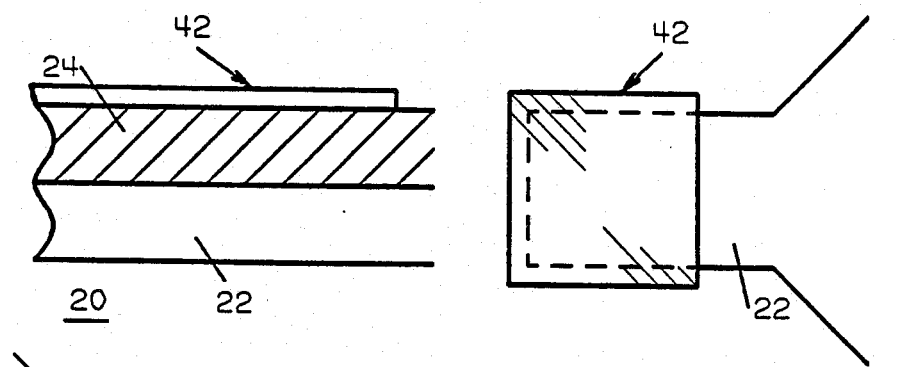
FIG. 8 is a diagram showing a modified process for deposition of the protective layer.

In an alternate embodiment, the protective layer 42 is deposited as in Step 4 above, and then patterned to cover only the pole tip area of the structure as shown in FIG. 8. In this embodiment, the protective layer 42 is not etched in step 5 since the protective layer 42 does not extend to the back gap region.

Figure 9:
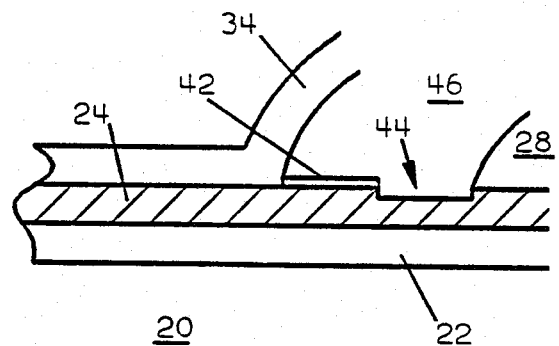
FIG. 9 is a partial longitudinal section view of a completed thin film magnetic head according to a first alternate embodiment of the invention which utilizes the modified process of FIG. 8.

In this embodiment, the leveling pad of insulation 46 is deposited in a similar manner as set forth in step 8 above, but the insulation covers the edge of the first insulating layer 28. In step 9, the protective layer is removed (FIG. 9) in the same manner as set forth in step 8 above. Note that a notch 44 is produced in the area between the end of protective layer 42 and the edge of the first insulating layer 28. Notch 44 does not affect the magnetic performance of the head since notch 44 occurs in an area in which the two magnetic pole pieces have diverged substantially, and the type of monmagnetic material present in this area does not significantly affect the head magnetic characteristics. The notch 44 is produced by the etching steps since the protective layer 42 does not extend to this area.

Figure 10:
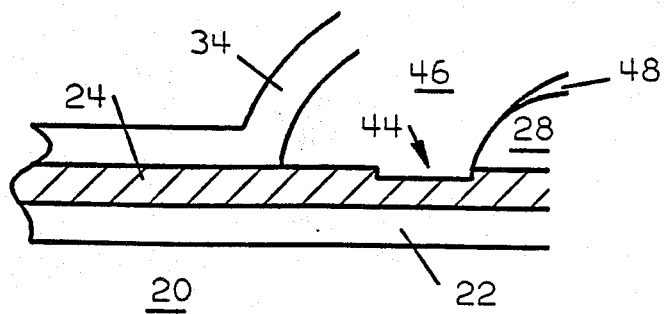
FIG. 10 is a partial longitudinal section view of a completed thin film magnetic head according to a second alternate embodiment of the invention which utilizes the modified process of FIG. 8.

In a further embodiment, the leveling pad of insulation is deposited in two separate depositions 46 and 48. In step 8 a second layer 48 of insulation is deposited in the same manner as set forth in step 8 above. In step 9, the protective layer 42 is removed in the same manner as set forth in step 9 above. Since the second layer 48 of insulation does not cover the edge of the first insulating layer 28, all of the protective layer is removed. However, the notch 44 is produced for the same reasons as described above. The third insulating layer 46 is then deposited in the same manner as set forth in step 8 above so that the edge of the layer 46 covers the edge of the first insulating layer 28 as shown in FIG. 10.

While the invention has been particularly shown and described with reference to a preferred embodiment thereof, it will be understood by those skilled in the art that various other changes in the form and details may be made therein without departing from the spirit and scope of the invention. For instance, chromium is the preferred material for the protective layers 26 and 42. Other materials could be used such as tantalum and titanium. The only criteria being that the material is resistant to the etching steps included in steps 5-8.

Having thus described my invention, what I claim as new, and desire to secure by Letters Patent is:

1. A method for making a thin film magnetic head comprising the steps of:

depositing a first layer of magnetic material to form a first pole piece having a front gap portion and a back gap portion;
   depositing a gap forming layer of nonmagnetic material over said first layer of magnetic material;
   depositing a gap protective layer of an etch resistant material covering at least said front gap portion of said magnetic head;
   depositing a first layer of insulation material;
   forming a conductive coil on said first layer of insulating material;
   depositing a second layer of insulation material over said conductive coil to provide a leveling pad;
   removing said gap protection layer in at least the front gap portion of said magnetic head; and
   depositing a second layer of magnetic material to form a second pole piece to complete the magnetic head.

2. The method of claim 1 wherein said gap protective layer is formed of chromium.

3. The method of claim 1 wherein said gap forming layer is formed of $Al_2O_3$.

4. The method of claim 1 comprising the additional step, performed after the step of depositing said gap protective layer, of patterning said gap protective layer to cover only said front gap portion of said first layer of magnetic material.

5. The method of claim 4 wherein said step of depositing said second layer of insulation is executed in two separate depositions.

6. The method of claim 5 wherein said gap protection layer is removed after the first of said two separate depositions of said second layer of insulation.

7. The thin film magnetic head made up the process of claim 1.

* * * * *